Patented July 20, 1954

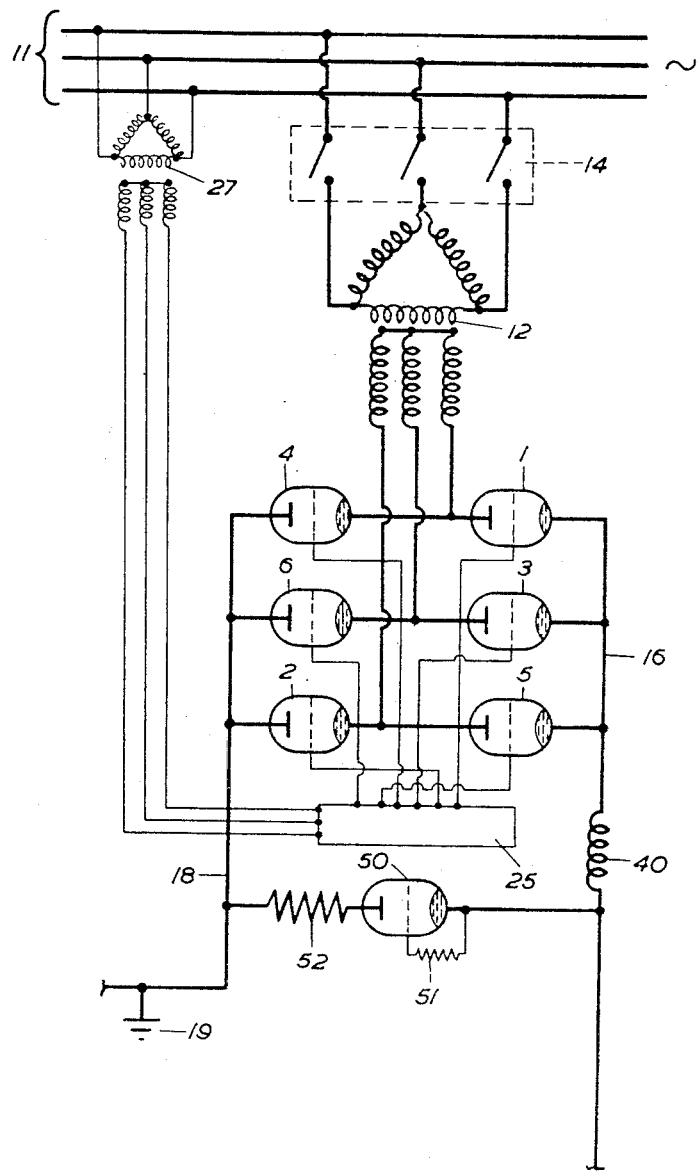

2,684,461

UNITED STATES PATENT OFFICE 2,684,461

DIRECT CURRENT ELECTRIC TRANSMISSION SYSTEM

Felix Busemann, Greenford, England, assignor, by mesne assignments, to E. R. A. Patents Limited, Leatherhead, England, a body corporate of Great Britain Application February 29, 1952, Serial No. 274,260

Claims priority, application Great Britain March 6, 1951

3 Claims. (Cl. 321—11)

This invention relates to high voltage direct current electric power transmission systems of the type in which valve converters connected in double path bridge arrangement serve to rectify alternating current from a mains supply transformer so as to provide direct current for the transmission line, and further valve converters connected in a corresponding manner at the far end of the line serve to invert the direct current and provide alternating current at the desired point.

In such systems, power is transmitted over the direct current line at voltages of the order of 100,000 volts with power of the order of 100,000 kilowatts. The valve converters are usually of the mercury-vapour type connected in three-phase bridge arrangement, both at the rectifying end and also at the inverting end. Thus each set comprises three pairs of converters connected anode to cathode, one pair for each transformer phase.

In general, a two conductor line is employed with the intermediate or mid point earthed, so that there is one set of six converters between one line conductor and the mid point, and a further set between mid point and the other line conductor. Each set is fed from a three-phase transformer with each phase of the secondary winding connected to the interconnected anode and cathode of one pair of converters. Choke coils for smoothing ripples are connected in both line conductors, both at the rectifier and inverter ends, and the converters are provided with control and timing circuits connected to their grids in the usual way.

The provision of circuit breakers for the required direct current voltages is not as simple as that of circuit breakers for alternating current since in the former case, the current does not pass through zero values at which the circuit can be effectively interrupted. On straight transmission lines with no interconnections, however, interruption of the direct current by grid control of the converters goes a long way towards performing the function of circuit breakers.

Grid blocking prevents the setting up of further grid impulses, but it cannot interrupt the current in the converters which are already carrying current at the time when grid blocking occurs. That current continues to flow until it reaches a zero value, but negative current cannot flow because the converters are incapable of reversing. However, the current usually very soon attains a zero value because after occurrence of grid blocking, there is an alternating voltage effective across the converters as long as the current flows. This alternating voltage, of which usually only the portion around the positive peak is utilised for setting up the direct current voltage, is left on the line also during the negative portion and very soon brings down the voltage to zero although with smoothing coils of very large inductance, it may take several cycles for the current to reach a zero value.

At that instant, the flow of current in the converters is interrupted and the grid blocking prevents the rectifier from sending out any more current. This action taking place at the rectifier has no immediate effect on the operation of the inverter. Thus at the instant that the current is interrupted at the rectifier, it is very likely that the inverter still carries considerable current. Then the inductance of the smoothing coils at the inverter end, which is usually large, maintains the current which is drawn as a discharge current from the capacitance of the line so that the line voltage is considerably reduced and may even swing over to negative. If the capacitance of the line is small relatively to the inductance of the smoothing coils in terms of the energy stored at rated values, it is possible for the line voltage to acquire a high negative value and to cause damage.

In order to prevent the occurrence of such high voltages on the line after grid blocking, it is the usual practice to connect across the line, valves which by-pass the rectifier converters and are grid-controlled so that they are blocked during normal operation of the system but are opened or released as soon as the main converters are blocked. Such by-pass valves in the case of bridge-connected rectifiers are connected across the outer line terminals on the rectifier side of the smoothing coils. The by-pass valves are blocked during normal operation because when the rectifier voltage is very much reduced by phase-control, for example, on starting or on the occurrence of faults, and the voltage wave therefore is utilised in the parts around the zero, the voltage on the rectifier side of the smoothing coil becomes negative during a part of the intervals between ignitions of the converters. The result which it is intended should be produced by the phase control would therefore be partially cancelled by the by-pass valve if it were not blocked during normal operation.

According to the present invention, instead of providing grid-controlled by-pass valves on the rectifying side of the smoothing coils, an uncontrolled unidirectionally conducting by-pass path is connected between each line conductor and earth on the side of the smoothing inductors remote from the rectifying installation and this path is connected in such a direction as to carry current if the polarity of the line becomes reversed under fault conditions. Preferably, a converter of the same type as is used in the rectifying installation is used to provide the unidirectional characteristic of the by-pass path, but it is possible to use simpler valve devices, such as electrolytic rectifiers, so long as they can carry the current surges which have to pass occasionally when the by-pass path becomes active.

This novel form of connection has several advantages. Thus such an uncontrolled by-pass is more reliable in action than a controlled valve, since it is not dependent on the proper working of the control equipment and is simplified by avoidance of the need for any connection to the control equipment.

Again, the connection of the by-pass valve directly to the line establishes a fixed lower level of voltage below which the line voltage cannot pass and the valve also prevents the line from acquiring the opposite polarity. This limitation of the lower voltage level is of advantage when successive restrikings of the converters occur as, for example, during starting when the rectifier and the inverter go alternately on the line. Furthermore, a by-pass on the line side of the smoothing coil reduces the time of dissipating the energy stored in the circuit since the portion stored in the inductance of the rectifier smoothing coil can be taken back into the alternating current supply system during the negative half wave of the alternating voltage which would not take place with a by-pass valve connected on the rectifier side of the smoothing coil.

A system in accordance with the invention will now be described in more detail with reference to the accompanying circuit diagram. The supply is taken from three-phase alternating current mains 11 to a transformer 12, the primary windings of which are connected in delta and the secondary windings in star. A circuit breaker 14 is provided to isolate the transformer from the mains 11. Each phase of the secondary winding of the transformer is connected to the midpoint between pairs of mercury vapour converters 1 and 4, 3 and 6 and 5 and 2. The converters of each pair are connected anode to cathode between an intermediate point constituted by a busbar 18 earthed at 19 and a positive line conductor 16. The whole equipment is duplicated between the negative line conductor and the intermediate point by the provision of a second transformer and a second set of six converters, and since this half is identical with that shown, it is not illustrated.

The grids of the converters have timed impulses applied to them in the usual manner by means of a control unit shown diagrammatically at 25 and energised by way of an auxiliary transformer 27 from the mains 11. These impulses are applied to the grids in the sequence of their reference numerals so that converter 1 fires first, followed at an interval of sixty electrical degrees of the alternating current cycle by converter 2 and then by converter 3 and so forth.

The positive line conductor 16 and also the negative line conductor, which is not shown, are provided with smoothing inductors 40. Between the positive line conductor 16 and the intermediate point 18 and on the side of the smoothing inductor 40 remote from the rectifying installation, a by-pass path is connected, comprising a mercury vapour converter 50 of the same type as the converters 1 to 6 used for rectifying purposes. The grid of the converter is connected to its cathode by way of a resistance 51 and, in addition, a resistance 52 is connected in the by-pass path.

Under normal conditions the valve action of the converter 50 prevents current flowing between the line conductor 16 and earth, but as soon as the polarity is reversed, a current controlled by the resistance 52 is allowed to flow, with the results already described.

If the line is a long one its own resistance is sufficient and the resistance 52 may be omitted. In the case of a short line, however, the resistance 52 is useful in dissipating the stored energy in the circuit, particularly in the smoothing inductor 40. In such a case, a resistance of the order of one tenth of the rated line-to-earth voltage divided by the rated line current, should be used.

I claim:

1. In a rectifying installation for a high voltage direct current electric power transmission system, the combination of a multi-phase alternating current supply, a multi-phase power transformer having its primary winding connected to said alternating current supply, a pair of direct current terminals, a plurality of pairs of rectifier units connected anode to cathode between said terminals, the phase connections of the secondary winding of said transformer being connected between the mid-points of said pairs of rectifier units, commutating means for said rectifier units, a line conductor connected to one of said terminals, a smoothing inductor connected in said conductor, and an uncontrolled, unidirectionally conducting by-pass path connected between the other of said direct current terminals and said line conductor at a point on the side of said smoothing inductor remote from said rectifier units, said by-pass path being connected in such a direction as to prevent the flow of rectified current therein from said rectifier units during normal operation but to carry current if the polarity of the direct current terminals becomes reversed under fault conditions.

2. In a rectifying installation for a high voltage direct current electric power transmission system, the combination of a three phase alternating current supply, a three phase power transformer having its primary winding connected to said alternating current supply, a pair of direct current terminals, three pairs of mercury vapour rectifies connected anode to cathode between said terminals, the phase connections of the secondary winding of said transformer being connected between the mid-points of said pairs of rectifiers, grid control means for said rectifiers, a line conductor connected to one of said terminals, a smoothing inductor connected in said conductor and a further mercury vapour rectifier connected between the other of said direct current terminals and said line conductor at a point on the side of said smoothing inductor remote from said pairs of rectifiers, said further rectifier having its anode connected to the same direct current terminal as the anodes of said pairs of rectifiers and having its grid connected to its cathode.

3. A rectifying installation according to claim 2, comprising in addition a resistance connected in series with said further mercury vapour rectifier between the other of said direct current terminals and said line conductor.

References Cited in the file of this patent

UNITED STATES PATENTS

| Number | Name | Date |
| --- | --- | --- |
| 2,532,107 | Lamm | Nov. 28, 1950 |
| 2,534,036 | Lamm | Dec. 12, 1950 |